United States Patent Office 3,163,608
Patented Dec. 29, 1964

3,163,608
LUMINESCENT MATERIALS
Perry N. Yocom, Princeton, N.J., assignor to Radio Corporation of America, a corporation of Delaware
No Drawing. Filed Apr. 6, 1962, Ser. No. 185,530
5 Claims. (Cl. 252—301.1)

This invention relates to novel luminescent materials which are particularly, but not necessarily exclusively, useful as laser materials.

Laser materials and systems are described by Vogel et al. in Electronics October 27, 1961, pages 40 to 47. The word "laser" is a short form for "light amplification by stimulated emission of radiation." Laser materials are luminescent materials which exhibit stimulated emission of radiation under a particular set of conditions. When a material exhibits a stimulated emission of radiation, it is said to lase. A laser material is usually a single crystal body of a matrix material having impurity ions or dopants contained therein. The desirable characteristics of a laser material result from the combination of matrix material, dopant and crystallinity of the material.

An object of this invention is to provide novel luminescent materials.

A further object is to provide novel laser materials.

In general, the luminescent materials of the invention have the molar composition:

$$AHa_2 : yM$$

where:

A is at least one of Ba, Ca, and Sr
Ha is at least one of Cl, Br, and I
M is at least one of $Sm^{+2}$, $Tm^{+2}$, and $U^{+3}$
y is between about $10^{-6}$ and $10^{-1}$ mol When excited with suitable radiant energy, the foregoing materials luminesce, emitting radiation, generally in the red and infrared regions of the spectrum. This luminescence occurs with the material at room temperature and at liquid nitrogen temperatures. The materials containing a high proportion of barium luminesce in narrow bands at both room and liquid nitrogen temperatures. The materials containing a high proportion of calcium and/or strontium emit in narrow bands at liquid nitrogen temperatures and in relatively broad bands at room temperature. The wavelength ranges of emitted radiation is related to the dopant. For divalent samarium $Sm^{+2}$, the range is about 5500 to 8500 A. For trivalent uranium $U^{+3}$, the range is about 6000 to 25,000 A. For divalent thulium $Tm^{+2}$, the range is about 10,000 to 12,000 A. Generally, the emission bands are shifted toward the shorter wavelengths when higher molecular weight A and Ha are selected. When the materials of the invention are prepared in single crystal form with high purity and crystallinity, some or all of the crystals can be made to lase with radiant excitation.

The following are some typical luminescent compositions of the invention:

$BaBr_2 : 0.01U^{+3}$
$BaBr_2 : 0.00004U^{+3}$
$BaBrCl : 0.001U^{+3}$
$BaCl_2 : 0.01Sm^{+2}$
$BaCl_2 : 0.1Sm^{+2}$
$BaClI : 0.0007Sm^{+2}$
$BaBrI : 0.001Tm^{+2}$
$(Ba_{0.8}Sr_{0.2})Cl_2 : 0.003Sm^{+2}$
$(Ba_{0.5}Sr_{0.5})ClBr : 0.001Sm^{+2}$
$(Ba_{0.6}Ca_{0.4})Br_2 : 0.0007Tm^{+2}$
$CaCl_2 : 0.01Sm^{+2}$
$CaCl_2 : 0.00001Sm^{+2}$
$CaBr_2 : 0.001Tm^{+2}$
$CaI_2 : 0.001U^{+3}$
$(Ca_{0.5}Sr_{0.5})Cl_2 : 0.005Sm^{+2}$
$(Ca_{0.5}Sr_{0.5})ClBr : 0.001Tm^{+2}$
$SrBr_2 : 0.004Sm^{+2}$
$SrI_2 : 0.0007Tm^{+2}$
$SrCl_2 : 0.01U^{+3}$
$SrClI : 0.001Sm^{+2}$
$Sr(Cl_{1.5}I_{0.5}) : 0.001U^{+3}$

The luminescent materials of the invention may be prepared by fusing together pure anhydrous constituent halides in atmospheres which are conducive to developing the desired valency in the dopant. Typically, one mol anhydrous $AHa_2$ and the desired mol proportion of MHa are fused together in a reducing atmosphere such as hydrogen or a neutral atmosphere, such as nitrogen, argon, neon, or combinations thereof. The dopant may be introduced as an oxide of M provided the atmosphere contains also the corresponding hydrogen halide. The melt is then solidified by cooling to room temperature in the atmosphere. The $AHa_2$ may be combinations of two or more different halides.

The $AHa_2$ and MHa are preferably substantially free of carbonaceous material, free water, and chemically combined water. Some reagent grade raw materials satisfy these requirements and some do not. Suitable $CaCl_2$ may be prepared from unsuitable reagent grade $CaCl_2$ as follows: Hydrated $CaCl_2$ is dried at 200° C. in air, then is melted in a dry HCl atmosphere, and then is cooled. The solidified melt is dissolved in water and filtered. The filtrate is evaporated and the remaining solids are dried in air at about 200° C. The dry solids are remelted under a dry HCl atmosphere, and the melt solidified to produce the purified raw material. $BaCl_2$ and $SrCl_2$ may be prepared by the same technique. $CaBr_2$, $CaI_2$, $BaBr_2$, $BaI_2$, $SrBr_2$, and $SrI_2$ may be prepared by the same technique except that HBr and HI atmospheres are substituted for HCl when preparing the bromides and iodides respectively. Direct combination of the metal and halogen can also be used as a means of preparation.

*Example 1.*—Mix $0.5 \times 10^{-3}$ mol $Sm_2O_3$ with 1 mol pure anhydrous $CaCl_2$. Melt the mixture in a dry atmosphere containing about equal parts by volume of hydrogen and HCl. The proportions in parts by volume of $H_2/HCl$ may be between 90/10 and 20/80. Solidify the melt by cooling to form a luminescent material having a tetragonal crystal structure and the molar formula $CaCl_2 : 0.001Sm^{+2}$. At liquid nitrogen temperatures and with visible or ultraviolet excitation, the material luminesces in narrow bands at wavelengths of about 6945 A., 7075A., and 7355 A.

*Example 2.*—To prepare cubic $SrCl_2 : 0.001Sm^{+2}$ follow the procedure of Example 1 except substitute $SrCl_2$ for $CaCl_2$.

*Example 3.*—To prepare orthorhombic $$BaCl_2 : 0.001Sm^{+2}$$

follow the procedure of Example 1 except substitute $BaCl_2$ for $CaCl_2$.

*Example 4.*—Mix $1.0 \times 10^{-3}$ mol $UF_4$ (or $UO_2$) with one mol pure anhydrous $BaBr_2$. Melt the mixture in a dry atmosphere containing about equal parts by volume of hydrogen and HBr. Solidify the melt by cooling to produce luminescent material having an orthorhombic crystal structure and the molar composition $$BaBr_2 : 0.001U^{+3}$$

With infrared, visible or ultraviolet excitation, the material luminesces at liquid nitrogen and room temperatures in narrow bands at wavelengths of about 2.420 microns, 1.410 microns, and 0.87 micron.

*Example 5.*—Mix $0.25 \times 10^{-3}$ mol $Tm_2O_3$ with 1 mol $BaBr_2$. Melt this mixture in a dry atmosphere containing about equal parts by volume of hydrogen and HBr and then solidify the melt by cooling. The solidified melt is mixed with $0.50 \times 10^{-3}$ mol thulium metal. This mixture is melted under a hydrogen atmosphere and then solidified by cooling. The product is a luminescent material having an orthorhombic crystal structure and the molar composition $BaBr_2:0.001Tm^{+2}$.

*Example 6.*—Mix $1.0 \times 10^{-3}$ mol $Sm_2O_3$ with one mol pure anhydrous $SrCl_2$ and one mol pure anhydrous $BaCl_2$. Melt the mixture in a dry atmosphere containing about equal parts by volume of hydrogen and HCl, and then solidify the melt by cooling. The product is a luminescent material having a cubic crystal structure and the molar formula $Sr_{0.5}Ba_{0.5}Cl_2:0.001Sm^{+2}$.

*Example 7.*—Mix $1.0 \times 10^{-3}$ mol samarium metal powder with one mol pure barium metal. Heat the mixture at about 800° C. in a stream of hydrogen gas containing elemental iodine in gaseous form. At this temperature, the metal mixture reacts with the gaseous iodine to form a molten product. The metal mixture floats on the melt. When all of the metal is reacted, solidify the melt by cooling. The product is a luminescent material having an orthorhombic crystal structure and the molar composition $BaI_2:0.001Sm^{+2}$.

The luminescent materials of the invention may be prepared as relatively large single crystals with a high degree of crystallinity. This may be achieved by melting the luminescent materials of the invention and growing crystals thereof by the Bridgman technique, either horizontal or vertical. The horizontal Bridgman technique is preferred. In one application of the Bridgman technique, a quantity of material is passed through two zones, one of which is maintained at temperatures about 20° C. above the melting point of the material and the other of which is maintained at temperatures about 20° C. below the melting point of the material. A rate of travel of about one inch per 24 hours through the zones has been found to be adequate. Large single crystals may also be grown by the Czochralski method.

What is claimed is:

1. A luminescent material having the molar composition:

$$AHa_2:yU^{+3}$$

where:

A is at least one material of the group consisting of Ba, Ca, and Sr

Ha is at least one material of the group consisting of Cl, Br, and I $U^{+3}$ is trivalent uranium y is between about $10^{-6}$ and $10^{-1}$ mol.

2. A luminescent material having the molar composition:

$$AHa_2:yU^{+3}$$

where:

A is one material of the group consisting of Ba, Ca, and Sr

Ha is one material of the group consisting of Cl, Br, and I $U^{+3}$ is trivalent uranium y is between about $10^{-6}$ and $10^{-1}$ mol.

3. A luminescent material having the molar composition:

$$Ba_xSr_{1-x}Cl_2:yU^{+3}$$

where:

y is between about $10^{-6}$ and $10^{-1}$ x is between about 0.0 and 1.0.

4. A luminescent material having the molar composition:

$$SrBr_2:yU^{+3}$$

where y is between about $10^{-6}$ and $10^{-1}$.

5. A luminescent material having an orthorhombic crystal structure and the molar composition:

$$BaBr_2:yU^{+3}$$

where y is between about $10^{-6}$ and $10^{-1}$.

References Cited in the file of this patent

Anom: Chem. and Eng. News, vol. 38, No. 52, p. 39. December 26, 1960. TPI 1418.

Batement: "Transactions of the Faraday Society," vol. 44, page 617 (1948).